No. 716,529. Patented Dec. 23, 1902.
I. J. FRENCH.
CIRCULATING WATER SYSTEM.
(Application filed Jan. 26, 1901.)
(No Model.) 3 Sheets—Sheet 1.
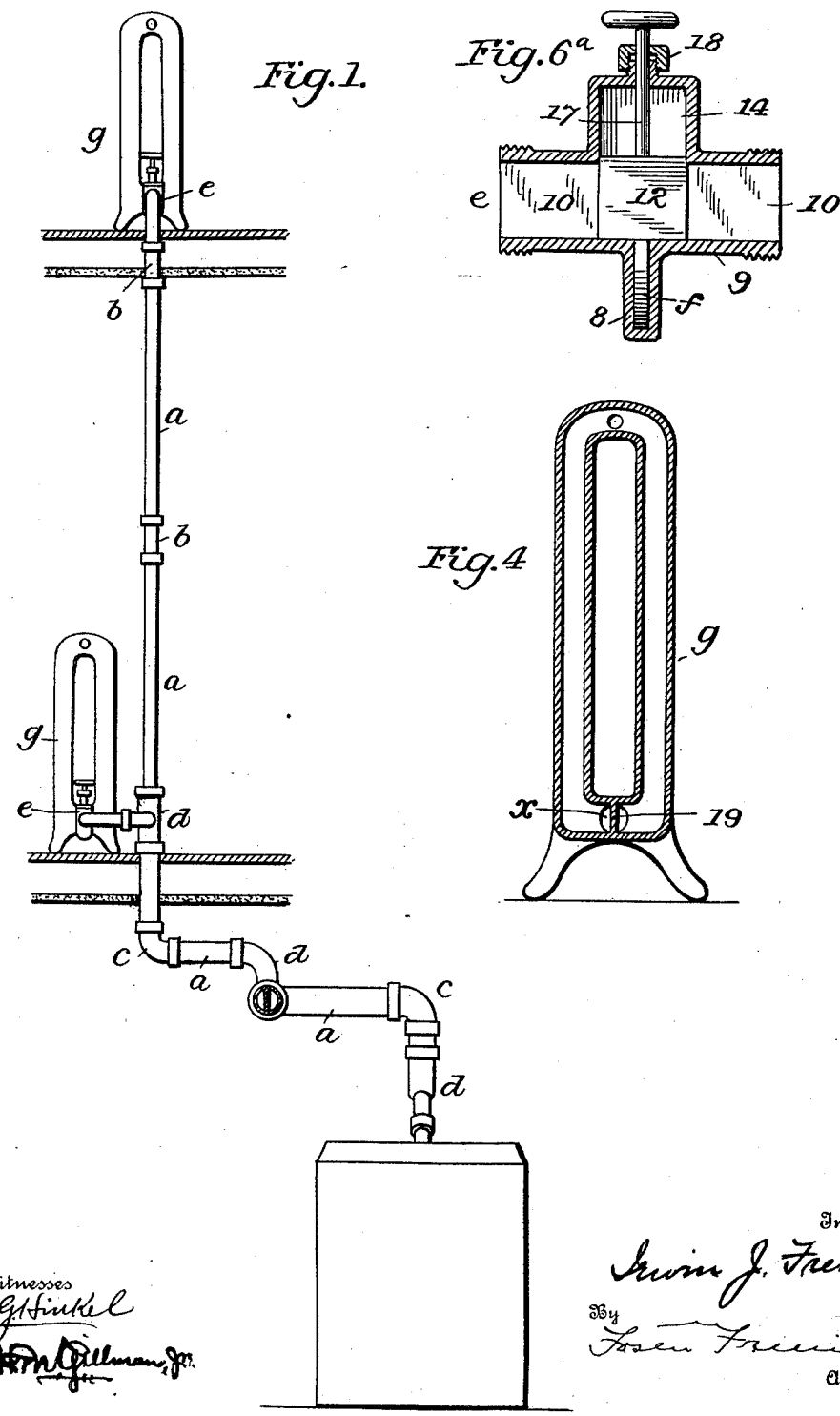

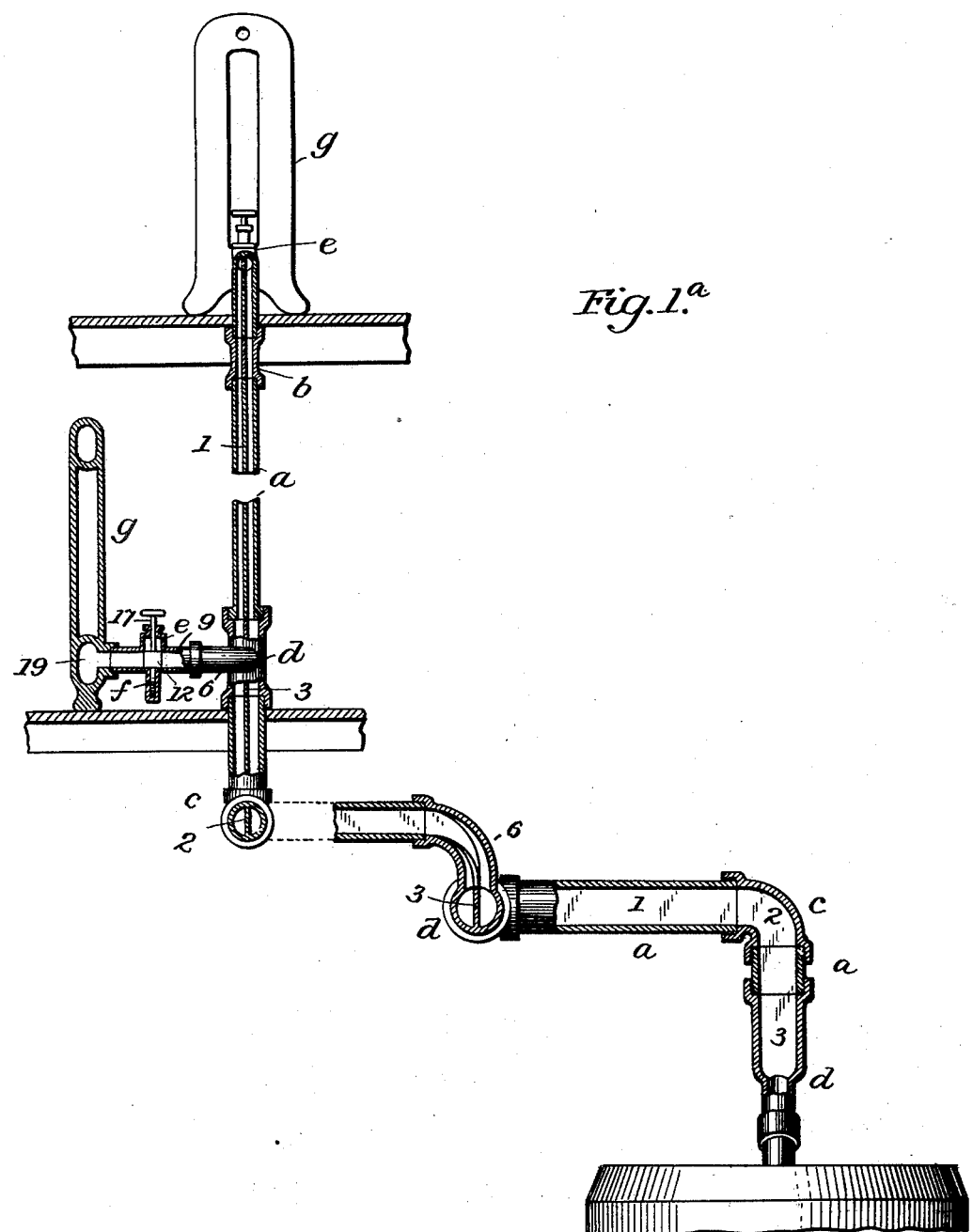

No. 716,529. Patented Dec. 23, 1902.
I. J. FRENCH.
CIRCULATING WATER SYSTEM.
(Application filed Jan. 26, 1901.)
(No Model.) 3 Sheets—Sheet 3.
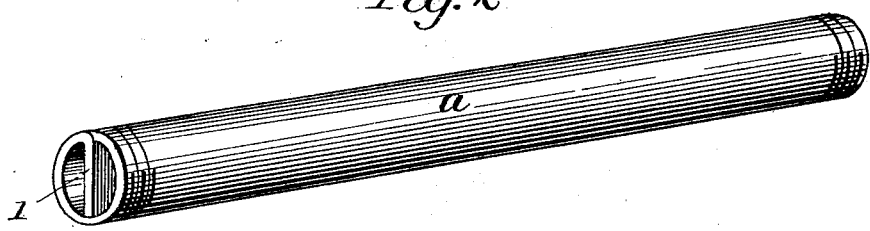
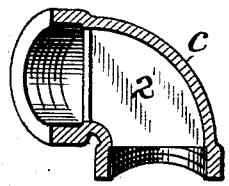
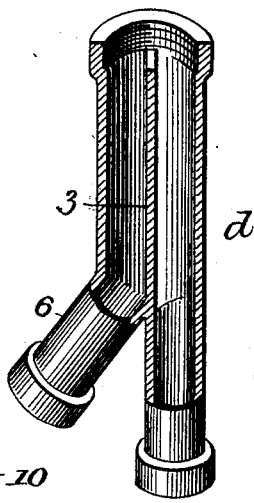
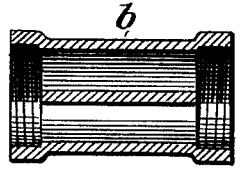
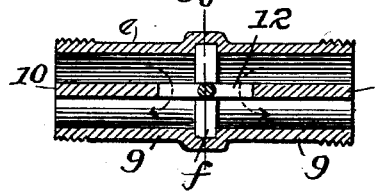
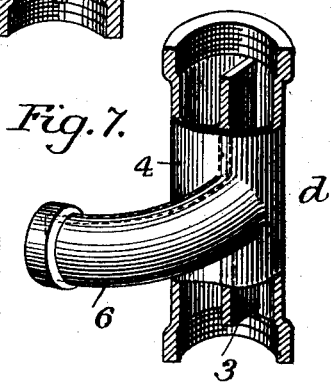
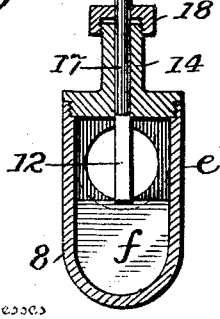
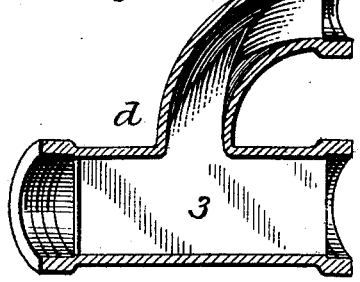
Witnesses
Inventor
Irwin J. French
By
Attorneys

UNITED STATES PATENT OFFICE.

IRWIN J. FRENCH, OF WASHINGTON, DISTRICT OF COLUMBIA.

CIRCULATING WATER SYSTEM.

SPECIFICATION forming part of Letters Patent No. 716,529, dated December 23, 1902.

Application filed January 26, 1901. Serial No. 44,878. (No model.)

*To all whom it may concern:*

Be it known that I, IRWIN J. FRENCH, a citizen of the United States, residing at Washington, in the District of Columbia, have invented certain new and useful Improvements in Circulating Water Systems, of which the following is a specification.

My invention has for its object to make use throughout a heating system of single pipes, valves, connections, and radiators, and this I secure by the use of parts each with a vertical partition, so as by the connection of these single elements to secure a complete continuous outflow-channel and a return-channel without the employment of any independent pipes or parts at any point of the system.

In the accompanying drawings, Figure 1 is an elevation, in part section, illustrating my system as embodied in a hot-water house-heating system. Fig. 1ª is an elevation, partly in section and partly broken away and on a larger scale than Fig. 1, to more clearly show the continuity of the partitions in the several parts of the piping. Fig. 2 is a perspective view illustrating the construction of the main straight-pipe members. Figs. 3 and 3ª are views in perspective and section of two of the bends; Fig. 4, a sectional view of one of the radiators; Fig. 5, a sectional plan of one of the valve devices; Fig. 6, a section on the line 6, Fig. 5. Fig. 6ª is a longitudinal sectional elevation of the valve devices; Fig. 7, a sectional perspective view of one of the branches; Fig. 8, a section showing a coupling; Fig. 9, a section showing the Y for connection with the steam and water spaces of a boiler; Fig. 10, a perspective sectional view illustrating the arrangement of partition in another form of bend.

The straight main members $a$ consist each of a pipe, preferably of wrought-iron, with a transverse longitudinal partition 1, which is vertical, whatever the arrangement of the pipe.

The pipes $a$ are threaded at the ends for union by the usual couplings, and the partition 1 is extended to the ends of each section, so that those of adjacent pipes will abut with packings between, if desired.

Each bend $c$ is divided by a partition 2, which is parallel to either the plane or curve of the bend, as in Figs. 3, 3ª, the ends of the bends threaded, and the partition extending nearly to the ends. The branches $d$ have longitudinal partitions 3 in the body portions 4, which partitions 3 extend also in vertical position through and divide the bends 6, Fig. 7.

Each valve-casing $e$ has a central casing 8, communicating with the body portions 9 9, each with a vertical partition 10, said casing extending downward, forming a pocket to receive a flat valve $f$, which may be raised to cut off passage through the valve or lowered to restore it, and when lowered a cross blade or portion 12 of the valve-stem forms, with the partitions 10 10, a continuous division through the valve structure. A neck 14 is shaped to form a pocket to receive the part 12 of the valve-stem when raised, the stem 17 extending through the packing-cap 18 and being provided with a handle.

Each radiator $g$ is divided by a vertical partition 19, which extends to and divides the port $x$, so that water passing in at one side of the port flows into one chamber and at the top to the other and then out through the other side of the port. The above-described parts are united according to the necessities of the construction, one arrangement being shown in Fig. 1, and when thus united form a duplex structure throughout the single-member system, each member being in external shape like one member of an ordinary double-pipe system, but serving the purposes of two members, one a delivery and the other a return member. Thus the weight of the structure is greatly reduced, the number of joints is just one-half those ordinarily required, dividing the labor and time for cutting threads and couplings, and greater compactness is secured with less loss of heat by radiation from the pipes.

In Fig. 10 is shown the arrangement where the branch arm extends from the top of a horizontal pipe. In this case the partition twists, as shown, so as to be vertical at the termination of each part of the structure.

In some instances the coupling $b$ may have a partition, said coupling internally threaded at the ends and the partition extending only to the threaded portions, as shown in Fig. 8; but where any of the members are threaded externally the partition extends to the ends.

The portion 12 of the valve device before described may be only as thick as the thickness of the valve $f$; but preferably it is formed into a wide blade, as shown in Fig. 6, so that when the valve $f$ and part 12 are raised the removal of the part 12 will leave the opening between the inner end of the partition 10 and the valve unobstructed, and the water can circulate from one passage to the other, as indicated by the arrows.

By the use of pipes and fittings with partitions arranged vertically, as set forth, there is secured a one-pipe system throughout— that is, there is no part of the system from the boiler to the radiators where it is necessary to use crossed pipes or two separate pipes, and the necessity of employing cast-metal pipes between the fittings is avoided, so that the horizontal and vertical piping throughout may be of wrought metal. Further, with horizontal pipes having vertical partitions a single opening at the upper or lower side serves to connect with both sides of the partition, while with a horizontal partition there must be both upper and lower openings and outside separate pipes and fittings.

Without limiting myself to the precise construction shown, I claim—

1. A heating system, consisting of radiators, a single main supply and return pipe, and single-pipe connections between the main supply and return pipe and the respective radiators, all having partitions and connected to each other in such manner that the partition of one will form a practical continuation of the partition of the other to which it is connected, substantially as set forth.

2. In a heating system consisting of radiators, a single main supply and return pipe, and single-pipe connections, between the radiators and the supply and return pipe, a branch piece consisting of a body-section having a partition and forming part of the main supply and return pipe and a lateral extension also having a partition forming a practical continuation of the partition of the body-section, said lateral extension forming a part of the single-pipe connection between the main supply and return pipe and a radiator, substantially as set forth.

3. A valve device consisting of the body portions 9, 9, with separated partitions 10, 10, said body portions each having an upwardly and a downwardly extending pocket between the opposing ends of the partitions, a valve movable between the partitions, said valve having two blades at right angles one above the other, one of said blades being movable into and out of one pocket and adapted to fill the space between the separated partitions, and the other blade being movable into and out of the other pocket and adapted to close communication between the body portions 9, 9, substantially as set forth.

In testimony whereof I have signed my name to this specification in the presence of two subscribing witnesses.

IRWIN J. FRENCH.

Witnesses:
J. J. McCARTHY,
W. CLARENCE DUVALL.